United States Patent
Chen et al.

(10) Patent No.: US 8,179,243 B2
(45) Date of Patent: May 15, 2012

(54) LANE DEPARTURE WARNING METHOD AND SYSTEM THEREOF

(75) Inventors: Liang-Kuang Chen, Taipei (TW); Yi-Jian Lian, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 538 days.

(21) Appl. No.: 12/504,666

(22) Filed: Jul. 17, 2009

(65) Prior Publication Data

US 2010/0182139 A1    Jul. 22, 2010

(30) Foreign Application Priority Data

Jan. 19, 2009    (TW) ................................. 98101914 A

(51) Int. Cl.
*B60Q 1/32* (2006.01)

(52) U.S. Cl. ..... 340/438; 340/436; 340/439; 340/425.5; 340/576; 701/301

(58) Field of Classification Search .................. 340/438, 340/436, 439, 441, 435, 425.5, 576; 701/1, 701/70, 301; 382/199
See application file for complete search history.

(56) References Cited

U.S. PATENT DOCUMENTS

| | | | |
|---|---|---|---|
| 7,424,364 B2 * | 9/2008 | Gern et al. ..................... | 701/301 |
| 7,561,032 B2 * | 7/2009 | Huang et al. .................. | 340/435 |
| 7,719,431 B2 * | 5/2010 | Bolourchi ..................... | 340/576 |

* cited by examiner

*Primary Examiner* — Toan N Pham
(74) *Attorney, Agent, or Firm* — Jianq Chyun IP Office

(57) ABSTRACT

A lane departure warning method and system thereof are provided. First a driver model is established, wherein the driver model is established according to a lateral position error of a vehicle being driven and a steering angle generated by a driver for controlling the vehicle. Next, a system identification process is performed on the lateral position error and the steering angle, so as to obtain specific information of the driver model. An estimation process is performed on the specific information and a plurality of raw statistical data, so as to obtain a time to lane crossing (TLC). A decision process is performed on the TLC and a driver drowsiness index, so as to obtain a lane departure warning strategy.

20 Claims, 3 Drawing Sheets

| Warning strategy / Time to Lane Crossing / Driver drowsiness index | Fuzzy rule | | | | | | |
|---|---|---|---|---|---|---|---|
| | Highly dangerous | Moderately dangerous | Minimally dangerous | Normal | Minimally safe | Moderately safe | Highly safe |
| Highly safe | Dangerous | Cautious | Cautious | Safe | Safe | Safe | Safe |
| Moderately safe | Dangerous | Dangerous | Cautious | Cautious | Safe | Safe | Safe |
| Moderately dangerous | Dangerous | Dangerous | Dangerous | Cautious | Cautious | Safe | Safe |
| Highly dangerousz | Dangerous | Dangerous | Dangerous | Dangerous | Cautious | Cautious | Safe |

FIG. 2

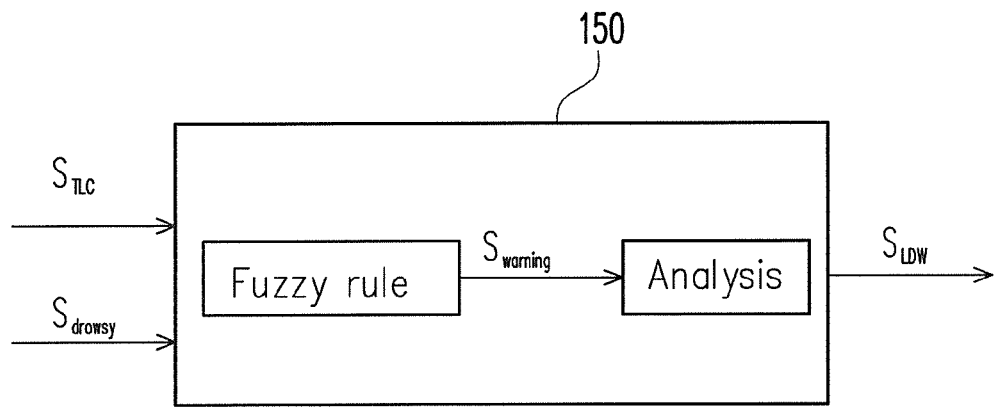

FIG. 3

LANE DEPARTURE WARNING METHOD AND SYSTEM THEREOF

CROSS-REFERENCE TO RELATED APPLICATION

This application claims the priority benefit of Taiwan application serial no. 98101914, filed on Jan. 19, 2009. The entirety of the above-mentioned patent application is hereby incorporated by reference herein and made a part of specification.

BACKGROUND OF THE INVENTION

1. Field of the Invention

The present invention is related to a lane departure warning method and system thereof, and particularly to a lane departure warning method and system thereof combining a time to lane crossing (TLC) and a driver drowsiness index.

2. Description of Related Art

Transportation safety receives significant attention and the authorities around the world are stricter on the regulations of transportation safety. Hence, transportation industries around the globe enthusiastically join the development of safety technologies and safety systems to ensure driving safety of drivers. In general, safety systems for transportation are classified into passive safety systems and active safety systems. The passive safety systems include, for example, air bags, safety belts, and energy absorbing steering column; the active safety systems include, for example, adaptive cruse control, electronic stability control, emergency brake assist, lane keeping assist, and lane departure warning systems (LDWS).

Lane departure means an event of a single vehicle departing from the intended lane due to improper control from the driver. Lane departure easily leads to traffic accidents, and the faster the vehicle is moving, the shorter the time for the driver to react before the accident. If the driver is notified at some critical time in advance to increase a reaction time thereof, it is beneficial to reduce the chances of traffic accidents, thereby enhancing driving safety. Hence, the lane departure warning systems, for preventing traffic accidents caused by lane departure, are correspondingly developed.

A main function of the lane departure warning systems is to prevent a vehicle from departing from its intended lane unexpectedly. Currently, each major car manufacturer has invested significant resources in development of the lane departure warning systems, and substantial results exist. The following exemplifies a plurality of the currently used lane departure warning systems and methods. A first kind of warning system is using a camera to detect when the vehicle departs from the lane, and simultaneously using a rear sensing radar to detect the potential accident during lane changes. A second kind is a system with a camera installed on the rear-view mirror to issue audio and video warning when the vehicle departs from the original lane. The third kind of system uses a camera and a radar installed on a side of the vehicle. If it is detected that the vehicle performs dangerous actions such as departing from the lane, the driver is warned by audio signals.

Several commercial lane departure warning systems issue the warning according to whether a time to lane crossing (TLC) reaches a dangerous threshold value, wherein the time to lane crossing means a time required to elapse from the present to the future for the vehicle to possibly contact a border of the lane. Said value is an estimated value and a degree of correctness thereof seriously affects the efficiency of the warning system. Further, behaviors of the driver are quite complex, and the alertness and response speed of the driver to danger under different driver states are obviously different. For example, when the driver is talking on a cell phone, dialing the number, falling asleep or picking up an object during driving, the driver negligence level is increased and the driver cannot concentrate on driving, thereby possibly causing the vehicle to depart from the lane unexpectedly and causing an accident. The driver control behavior obviously influences the vehicle driving safety seriously. However, current commercial lane departure warning systems do not take into consideration of the driver state, and are not capable of performing appropriate adjustments corresponding to the driver state and behavior mode to achieve a warning strategy most suitable for the driver at the moment.

SUMMARY OF THE INVENTION

The present invention provides a lane departure warning method and a system thereof which predicts a time to lane crossing according to a control model of a driver and the dynamic information of a vehicle, and adjusts a lane departure warning strategy according to the aforementioned time to lane crossing and a level of drowsiness of the driver.

The present invention provides a lane departing warning method. First, a driver model is estimated, wherein the driver model is established according to a lateral position error of the vehicle and a steering angle command from a driver for controlling the vehicle. A system identification process is performed on the lateral position error and the steering angle, so as to obtain specific information of the driver model. An estimation process is performed on the specific information and a plurality of raw data, so as to obtain an estimation of a time to lane crossing. A decision process is performed on the time to lane crossing and a driver drowsiness index, so as to obtain a lane departure warning strategy.

According to an embodiment of the present invention, the above lane departure warning method further includes performing an analytical process on the specific driver information, so as to obtain the driver drowsiness index.

According to an embodiment of the present invention, the above lane departure warning method further includes performing an analytical process on a physiological status of a driver, so as to obtain the driver drowsiness index.

According to an embodiment of the present invention, the above lane departure warning method further includes performing an analytical process on a driving performance of a driver, so as to obtain the driver drowsiness index.

The present invention provides a lane departure warning system which includes a system identification module, an estimation module and a decision module. The system identification module establishes a driver model and uses a lateral position error of a vehicle being driven and a steering angle to perform a system identification process, so as to obtain specific information of the driver model. The estimation module is coupled to the system identification module, and performs an estimation process on the specific information and a plurality of raw data, so as to obtain a time to lane crossing. The decision module is coupled to the estimation module, and performs a decision process on the time to lane crossing and a driver drowsiness index, so as to obtain a lane departure warning strategy.

According to an embodiment of the present invention, the above lateral position error is a lateral difference between an actual path of the vehicle being driven and a predetermined path.

According to an embodiment of the present invention, the above specific information includes a time function of the steering angle.

According to an embodiment of the present invention, the above raw statistical data include the steering angle, a lateral displacement, a lateral displacement speed, a deviation angle and a deviation angular speed.

According to an embodiment of the present invention, the above time to lane crossing is a time required for the vehicle to be driven to a border of a lane.

According to an embodiment of the present invention, the above decision process includes performing a judgment process on the driver drowsiness index and the time to lane crossing through a fuzzy rule (FR), so as to obtain a lane departure warning strategy.

According to an embodiment of the present invention, the above decision process includes performing a judgment process on the driver drowsiness index and the time to lane crossing through a support vector machine (SVM) theory, so as to obtain a lane departure warning strategy.

According to an embodiment of the present invention, the above lane departure warning system further includes a driver status monitor module coupled to the system identification module and the decision module and performing an analytical process on the specific information, so as to obtain the driver drowsiness index.

According to an embodiment of the present invention, the above lane departure warning system further includes a driver status monitor module coupled to the decision module and performing an analytical process on a physiological status of a driver, so as to obtain the driver drowsiness index.

According to an embodiment of the present invention, the above lane departure warning system further includes a driver status monitor module coupled to the decision module and performing an analytical process on a driving performance of a driver, so as to obtain the driver drowsiness index.

In light of the above, the lane departure warning system and system thereof adopts the lateral position error and the steering angle to establish the driver model, and accurately predicts the time to lane crossing according to the control behaviors of the driver and the dynamic information of the vehicle. In addition, by combining the time to lane crossing and the driver drowsiness index, the lane departure warning strategy complying to the driver status is obtained.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2 is a schematic table showing a fuzzy rule.

FIG. 3 is a schematic view showing a decision module of FIG. 1.

DESCRIPTION OF EMBODIMENTS

Figure 1:
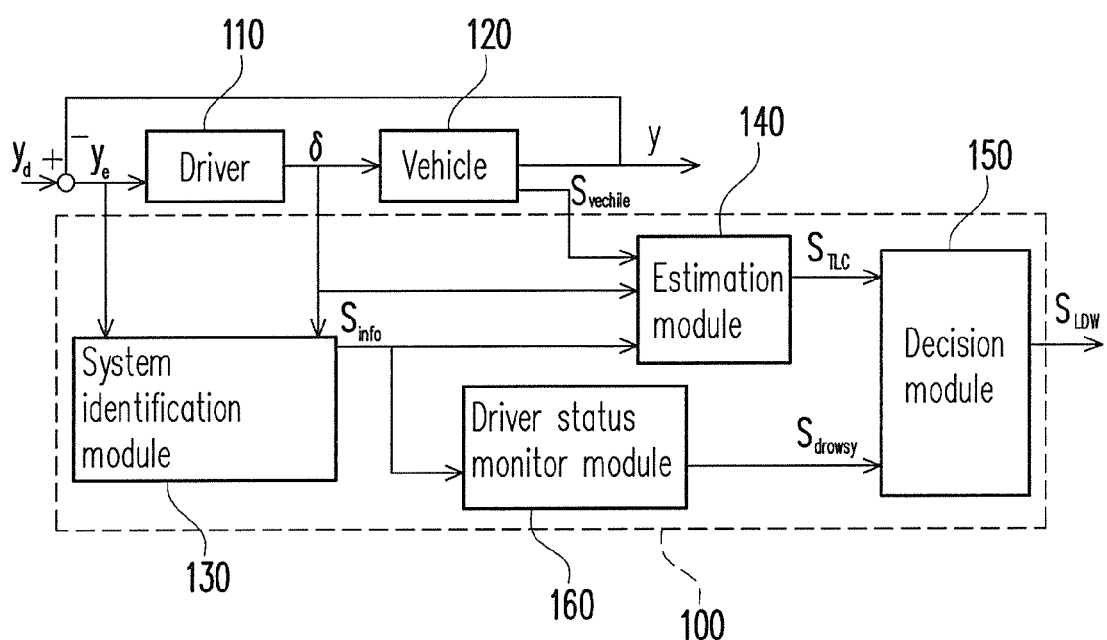
FIG. 1 is a schematic view showing a lane departure warning system according to an embodiment of the present invention.

FIG. 1 is a schematic view showing a lane departure warning system according to an embodiment of the present invention. Referring to FIG. 1, a lane departure warning system 100 according to the present embodiment includes a system identification module 130, an estimation module 140 and a decision module 150. The system identification module 130 establishes a driver steering control model therein. A structure of the driving model is a model of assuming that a human driver 110 generates a steering angle $\delta$ according to a lateral position error $y_e$ to control a vehicle 120 (for example a car), wherein the lateral position error $y_e$ is a lateral difference between a lateral position y of the vehicle 120 being driven and a predetermined desired lateral position $y_d$; the steering angle $\delta$ is a signal of controlling an angle of a steering wheel.

The system identification module 130 performs a iterative system identification process on the lateral position error $y_e$ of the vehicle 120 being driven and the steering angle $\delta$, so as to obtain specific information $S_{info}$ of the driver model. The estimation module 140 is coupled to the system identification module 130, and performs an estimation process on the specific information $S_{info}$, so as to obtain a time to lane crossing $S_{TLC}$ (a time required to elapse from the present moment to a moment the vehicle 120 contacts a lane boundary). The specific information $S_{info}$ includes the identified driver steering control model, which is used to calculate the values of the steering angle $\delta$ at each future time points by the estimation module 140; the raw statistical data includes a set of past values of the steering angle $\delta$ and the vehicle information $S_{vehicle}$, wherein the vehicle information $S_{vehicle}$ includes the lateral displacement y of the vehicle 120, a lateral speed v, a heading yaw angle $\phi$ and a deviation angular speed r.

In detail, vehicle information $S_{vehicle\_0}$ at an initial time point (a lateral displacement $y_0$, a lateral displacement speed $v_0$, a deviation angle $\phi_0$ and a deviation angular speed $r_0$) and a steering angle $\delta_0$ is known by measurement, or by an state estimator to calculate these initial vehicle states (the lateral displacement $y_0$, the lateral displacement speed $v_0$, the deviation angle $\phi_0$ and the deviation angular speed $r_0$), vehicle information $S_{vehicle\_1}$ at a next time point (a lateral displacement $y_1$, a lateral displacement speed $v_1$, a deviation angle $\phi_1$ and a deviation angular speed $r_1$) is obtained by numerical integration. In addition, the future driver command prediction process is performed on a lateral position error $y_{e\_1}$ and the steering angle $\delta_0$ at the initial time point by the estimation module 140, so as to obtain the steering angle $\delta_1$ at the next time point. Then, by calculation of the vehicle states (the lateral displacement $y_1$, the lateral displacement speed $v_1$, the deviation angle $\phi_1$, the deviation angular speed $r_1$ and the steering angle $\delta_1$) at the next time point, vehicle information $S_{vehicle\_2}$ at a further next time point (a lateral displacement $y_2$, a lateral displacement speed $v_2$, a deviation angle $\phi_2$ and a deviation angular speed $r_2$) is obtained. In a similar way, a further path of the vehicle 120 being driven is predicted within the prediction horizon, a time point at which the vehicle 120 crosses the border of the lane is then determined according to the path, and the time to lane crossing $S_{TLC}$ is obtained.

The decision module 150 is coupled to the estimation module 140, and performs a decision process on the time to lane crossing $S_{TLC}$ and a driver drowsiness index $S_{drowsy}$, so as to obtain a lane departure warning strategy $S_{LDW}$. According to the present embodiment, a method by which the decision module 150 performs the decision process is performing a judgment process on the driver drowsiness index $S_{drowsy}$ and the time to lane crossing $S_{TLC}$ through a fuzzy rule (FR), so as to obtain the lane departure warning strategy $S_{LDW}$.

FIG. 2 is a schematic table showing a fuzzy rule. FIG. 3 is a schematic view showing a decision module of FIG. 1. Referring to both FIGS. 2 and 3, the fuzzy rule according to the present embodiment classifies a value of the time to lane crossing $S_{TLC}$ into highly dangerous, moderately dangerous, minimally dangerous, normal, minimally safe, moderately safe, and highly safe according to a value of the time to lane crossing $S_{TLC}$. Furthermore, according to a value of the driver drowsiness index $S_{drowsy}$, a status thereof is classified as highly dangerous, moderately dangerous, moderately safe and highly safe. Next, according to a judgment method in FIG. 2, whether a particular maneuver is considered dangerous, cautious or safe is determined, and the warning strategy $S_{warning}$ is analyzed to establish the lane departing warning strategy $S_{LDW}$.

Figure 4:
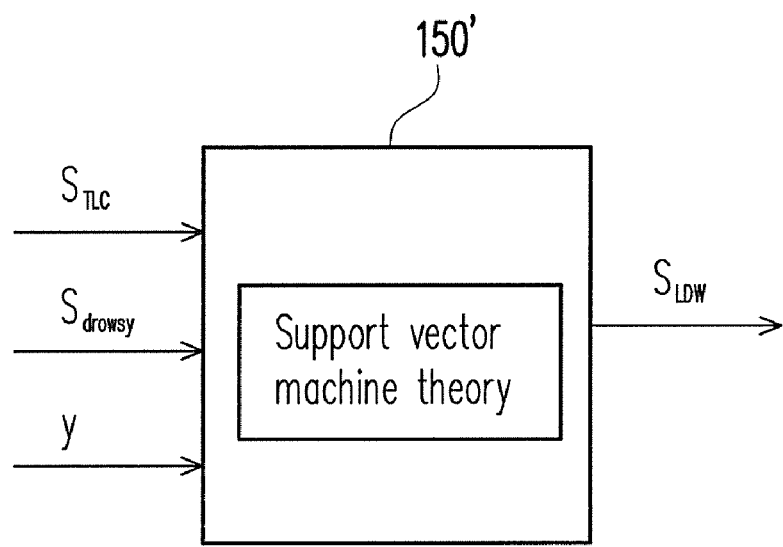
FIG. 4 illustrates a schematic view showing a decision module according to another embodiment of the present invention.

FIG. 4 illustrates a schematic view showing a decision module according to another embodiment of the present invention. Referring to FIG. 4, in contrast to the decision module 150 in FIG. 3, a method of performing the decision process by a decision module 150' according to the present embodiment is using recorded data when the driver is actually driving during a test run, including the time to lane crossing $S_{TLC}$, the driver drowsiness index $S_{drowsy}$, and the lateral displacement y as a training data set to train a decision hyperplane through the support vector machine theory, and thus classifying the driving status into two subsets of safe driving and dangerous driving. The decision module 150' then establishes the lane departure warning strategy $S_{LDW}$ according to the above.

Figure 5:
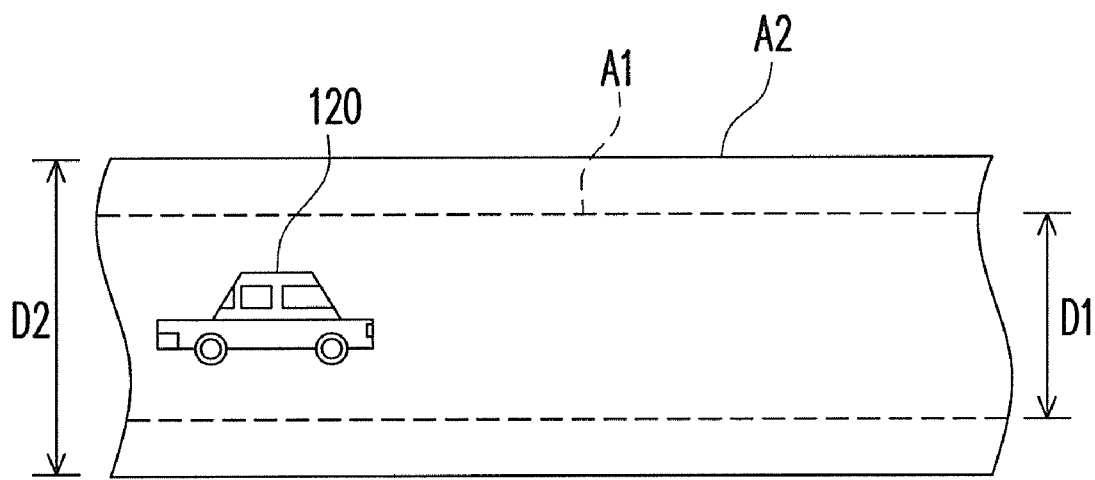
FIG. 5 is a schematic view showing a virtual lane.

When training the decision hyperplane, a width of the virtual lane is dynamically reduced as the driver drowsiness index $S_{drowsy}$ increases, so that the time to lane crossing $S_{TLC}$ is appropriately adjusted according to a degree of drowsiness of the driver, so that the trained hyperplane distinguishes between safe driving and dangerous driving more accurately. FIG. 5 is a schematic view showing a virtual lane. Referring to FIG. 5, for example, a width D1 of a virtual lane A1 is smaller than a width D2 of a virtual lane A2, wherein the virtual lane A1 is suitable for a situation in which the driver drowsiness index $S_{drowsy}$ is higher, and the virtual lane A2 is suitable for a situation in which the driver drowsiness index $S_{drowsy}$ is lower.

In general, the indices used to assess efficiency of the lane departure warning system include a false alarm improvement rate (FAIR) during a driving scenario consisting of repeated near lane departure events, and a reaction time (RT) during a driving scenario consisting of several scheduled lane departure events. The FAIR is defined as a false alarm suppression percentage of a lane departure warning system relative to a baseline lane departure warning system. The RT is defined as a time difference between a time point at which the vehicle crosses the lane and a time point at which the lane departure warning system acts earliest and consecutively.

The following provides evaluation comparison of the lane departure warning system of the present embodiment according to the above efficiency indices of the lane departure warning system.

TABLE 1

|  | FAIR | RT |
|---|---|---|
| B | Base value | 1.08 |
| FR | 73.79 | 1.41 |
| SVM | 100 | 2.36 |
| Unit | % | Second |

Table 1 is an index evaluation table showing efficiency of the lane departure warning system. Referring to Table 1, efficiency of the above lane departure warning strategy established using the fuzzy rule (denoted FR in Table 1) in cooperation with the time to lane crossing or of the lane departure warning strategy (denoted SVM in Table 1) established using the support vector machine theory in cooperation with the time to lane crossing is significantly enhanced relative to the baseline lane departure warning strategy (denoted B in Table 1) established only according to the time to lane crossing. In detail, in comparison data of Table 1, improvement rates of false alarms of FR and SVM relative to B are as high as 73.79% and 100% The reaction time of FR and SVM are 1.41 seconds and 2.36 seconds respectively, which are both greater than the reaction time of B (1.08 seconds), meaning that the driver has been warned earlier to yield more reaction time.

In addition, the decision hyperplane trained through the above support vector machine theory has good performance when applied to different drivers. In other words, according to the driver information of a driver, the decision hyperplane trained through the support vector machine theory may be applied to another driver to provide the lane departure warning.

TABLE 2

|  | FAIR | RT |
|---|---|---|
| B | Base value | 0.80 |
| SVM' | 100 | 2.42 |
| Unit | % | Second |

Table 2 is an index evaluation table showing efficiency of the lane departure warning system with the decision hyperplane being applied to different drivers. Referring to Table 2, the lane departure warning system (denoted SVM' in Table 2) with the decision hyperplane being applied to a different driver has an improvement rate of false alarms of 100% relative to the lane departure warning strategy (denoted B in Table 2) established only according to the time to lane crossing, under the specified testing conditions. The reaction time of SVM' is 2.42 seconds and is greater than the reaction time of B (0.8 second), meaning that the driver has a more ample reaction time.

The lane departure warning system 100 in FIG. 1 further includes a driver status monitor module 160. The driver status monitor module 160 is coupled to the system identification module 130 and the decision module 150 and performs the analytical process on the specific information $S_{info}$, so as to obtain the driver drowsiness index $S_{drowsy}$. Besides including the time function of the above steering angle δ, the specific information $S_{info}$ further includes information such as a phase lead obtained through the driver model transferring a functional operation, a maximum phase lead, a direct current (DC) gain, a crossover frequency and a main frequency of the steering angle δ, so as to deduce the driver drowsiness index $S_{drowsy}$.

However, the present invention does not limit methods of obtaining the driver drowsiness index. By monitoring the physiological status of the driver, the driver status monitor module 160 further performs the analytical process on the physiological status of the driver, so as to obtain the driver drowsiness index $S_{drowsy}$. The physiological status of the driver is, for example, an external physiological characteristic, such as closing of eyes, a staring direction of eyes or a movement of a head; it may also be an internal physiological characteristic, for example brain waves or heart beats. In addition, by monitoring the driving performance of the driver, the driver status monitor module 160 further performs the analytical process on the driving performance of the driver, so as to obtain the driver drowsiness index $S_{drowsy}$. The driving performance is, for example, pressure changes of stepping on the gas pedal and brake pedal, driving performance when following a car and changes in angles of a steering wheel. It should be noted that if the driver status monitor module 160 obtains the driver drowsiness index $S_{drowsy}$ through above monitoring and analyzing the physiological status or driving performance but not through performing the analytical process on the specific information $S_{info}$, the driver status monitor module 160 only needs to be coupled to the decision module 150 but not to the system identification module 130.

In summary, the lane departure warning system and system thereof adopts the lateral position error and the steering angle to establish the driver steering control model on-line, and accurately predicts the time to lane crossing according to the control model of the driver and the dynamic information of the vehicle. Next, by combining the time to lane crossing and the driver drowsiness index, the lane departure warning strategy complying to the driver status is obtained. In addition, when establishing the lane departure warning system, the fuzzy rule or the support vector machine theory is further combined, so that the more accurate lane departure warning strategy is obtained.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A lane departure warning method, comprising:
    establishing a driver model, wherein the driver model generates a steering angle according to a lateral position error of a vehicle being driven to control driving of the vehicle;
    performing a system identification process on the lateral position error and the steering angle, so as to obtain specific information of the driver model;
    performing an estimation process on the specific information and a plurality of raw statistical data, so as to obtain a time to lane crossing; and
    performing a decision process on the time to lane crossing and a driver drowsiness index, so as to obtain a lane departure warning strategy.

2. The lane departure warning method of claim 1, wherein the lateral position error is a lateral difference between an actual path of the vehicle being driven and a predetermined path.

3. The lane departure warning method of claim 1, wherein the specific information comprises a time function of the steering angle.

4. The lane departure warning method of claim 1, wherein the raw statistical data comprises the steering angle, a lateral displacement, a lateral displacement speed, a deviation angle and a deviation angular speed.

5. The lane departure warning method of claim 1, wherein the time to lane crossing is a time required for the vehicle to be driven to a border of a lane.

6. The lane departure warning method of claim 1, wherein the decision process comprises:
    performing a judgment process on the driver drowsiness index and the time to lane crossing through a fuzzy rule, so as to obtain a lane departure warning strategy.

7. The lane departure warning method of claim 1, wherein the decision process comprises:
    performing a judgment process on the driver drowsiness index and the time to lane crossing through a support vector machine theory, so as to obtain a lane departure warning strategy.

8. The lane departure warning method of claim 1, further comprising performing an analytical process on the specific information, so as to obtain the driver drowsiness index.

9. The lane departure warning method of claim 1, further comprising performing an analytical process on a physiological status of a driver, so as to obtain the driver drowsiness index.

10. The lane departure warning method of claim 1, further comprising performing an analytical process on a driving performance of a driver, so as to obtain the driver drowsiness index.

11. A lane departure warning system, comprising:
    a system identification module, establishing a driver model and performing a system identification process on a lateral position error of a vehicle being driven and a steering angle, so as to obtain specific information of the driver model;
    an estimation module coupled to the system identification module, performing an estimation process on the specific information and a plurality of raw statistical data, so as to obtain a time to lane crossing; and
    a decision module coupled to the estimation module, performing a decision process on the time to lane crossing and a driver drowsiness index, so as to obtain a lane departure warning strategy.

12. The lane departure warning system of claim 11, wherein the lateral position error is a lateral difference between an actual path of the vehicle being driven and a predetermined path.

13. The lane departure warning system of claim 11, wherein the specific information comprises a time function of the steering angle.

14. The lane departure warning system of claim 11, wherein the raw statistical data comprises the steering angle, a lateral displacement, a lateral displacement speed, a deviation angle and a deviation angular speed.

15. The lane departure warning system of claim 11, wherein the time to lane crossing is a time required for the vehicle to be driven to a border of a lane.

16. The lane departure warning system of claim 11, wherein the decision process comprises:
    performing a judgment process on the driver drowsiness index and the time to lane crossing, so as to obtain a lane departure warning strategy.

17. The lane departure warning system of claim 11, wherein the decision process comprises:
    performing a judgment process on the driver drowsiness index and the time to lane crossing through a support vector machine theory, so as to obtain a lane departure warning strategy.

18. The lane departure warning system of claim 11, further comprising a driver status monitor module coupled to the system identification module and the decision module and performing an analytical process on the specific information, so as to obtain the driver drowsiness index.

19. The lane departure warning system of claim 11, further comprising a driver status monitor module coupled to the decision module and performing an analytical process on a physiological status of a driver, so as to obtain the driver drowsiness index.

20. The lane departure warning system of claim 11, further comprising a driver status monitor module coupled to the decision module and performing an analytical process on a driving performance of a driver, so as to obtain the driver drowsiness index.

* * * * *